March 15, 1966  H. E. SNYDER  3,240,502
SELF-ALIGNING CABLE SEAL
Filed Sept. 14, 1962  2 Sheets-Sheet 1
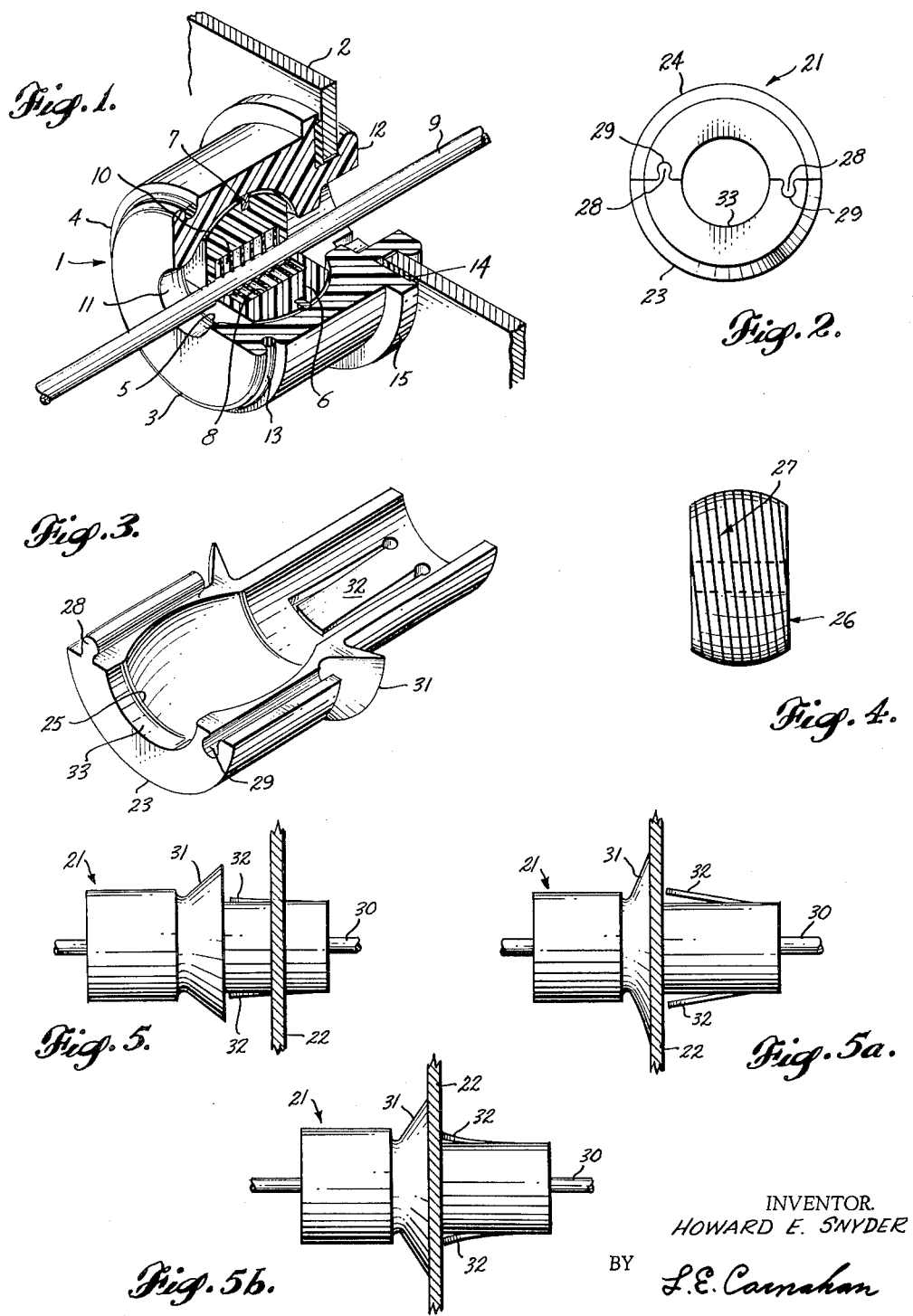
INVENTOR.
HOWARD E. SNYDER
BY L.E. Carnahan
AGENT March 15, 1966 H. E. SNYDER 3,240,502
SELF-ALIGNING CABLE SEAL
Filed Sept. 14, 1962 2 Sheets-Sheet 2

INVENTOR.
HOWARD E. SNYDER
BY L. E. Carnahan
AGENT

United States Patent Office 3,240,502
Patented Mar. 15, 1966

3,240,502
SELF-ALIGNING CABLE SEAL
Howard E. Snyder, Seattle, Wash., assignor to The Boeing Company, Seattle, Wash., a corporation of Delaware
Filed Sept. 14, 1962, Ser. No. 223,718
1 Claim. (Cl. 277—100)

This invention relates to seals, and more particularly to control cable seals such as those located in pressurized aircraft compartments.

In many instances it is necessary to pass aircraft control cables through the pressurized compartments of the aircraft. Therefore, it is essential to provide means to prevent the escape of cabin air pressure around the cables and at the same time allow for unrestricted movement of such cables.

Cable seals currently used for this purpose have one or more of the following shortcomings:

(1) are sensitive to the exposure of ozone, lubricants, hydraulic fluids, low or high temperature, moisture, high energy radiation and abrasion, and to misalignment;

(2) must be severely deformed in order to install, with the possibility of undetectable damage occurring during installation;

(3) seal surfaces cannot be inspected either prior to or after installation;

(4) require access to both the pressurized and the unpressurized areas for installation;

(5) require removal of the cable for assembly and disassembly; and (6) create undesirable noise due to air leakage therethrough.

One of the most important problems associated with seals currently used is a flight safety item. In the event of tearing, decomposition, or accidental severe bending of the portion of the seal which protrudes into the unpressurized compartment, fragments of the broken seal which are circular travel along the cable and cause jamming or other malfunctions of pulleys or other devices.

Prior attempts to solve these problems include new elastomeric compounds, fabric reinforcement of local high stress areas, nylon grommets entrapped in the flange area of the rubber for reinforcement, and the use of nylon per se. None of the prior attempts have overcome the problems set forth above; especially when these seals are utilized in pressurized aircraft cabins.

Therefore, an object of the invention is to provide a cable seal which necessitates access to only one side of a panel for installation.

A further object of the invention is to provide a seal which allows for misalignment of the cable therein without damage to the seal.

A still further object of the invention is to provide a cable seal which is not sensitive to exposure to ozone, lubricants, hydraulic fluids, low or high temperature, and abrasion.

Another object of the invention is to provide a cable seal which can be assembled or disassembled without removal of the associated cable.

Another object of the invention is to provide a cable seal which functions to suppress the noise created by any fluid leakage therethrough.

Another object of the invention is to provide a cable seal which requires very slight deformation for installation leaving little or no chance of seal damage during installation.

Another object of the invention is to provide a cable seal having surfaces which are available for inspection during sub-assembly, and immediately prior to and after installation.

Another object of the invention is to provide a cable seal having no retaining rings or other circular elements which could cause jamming of pulleys or other flight safety malfunction.

These and other objects of the invention not specifically set forth above will become readily apparent from the accompanying description and drawings in which:

FIG. 1 is an isometric view of one embodiment of the invention in the operative position on a bulkhead and having a section thereof cut away.

FIG. 2 is an end view of the casing of another embodiment of the invention.

FIG. 3 is an isometric view of one-half of the cable seal casing of FIG. 2.

FIG. 4 is a side view of the helically split ball type sealing element utilized in the FIG. 2 cable seal.

FIG. 5, 5a and 5b are side views of the FIG. 2 cable seal showing different positions of attaching the cable seal to a bulkhead.

FIG. 11a is a cross-sectional view taken on line 11a—11a of FIG. 10a.

Figure 6:
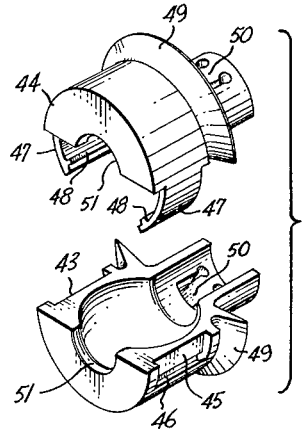
FIG. 6 is a separated isometric view of the casing of a preferred embodiment of the invention.

Referring now to FIG. 1 wherein the cable seal generally indicated at 1 is shown operatively attached to a bulkhead 2, such as a pressure bulkhead of an aircraft compartment. Cable seal 1 includes identical body halves or casing sections 3 and 4, part of body half 4 being cut away in FIG. 1 to show the other elements of the seal. Body halves 3 and 4 are formed to define a cavity 5 within which a split ball 6 is pivotally positioned. A split ring or washer 7 functions as a seal between ball 6 and body halves 3 and 4. Ball 6 is provided with a chamber 8 through which control cable 9 passes. Located within chamber 8 and surrounding cable 9 is a seal means 10, said seal 10 being of the split ring or washer type or a continuous spiral (helically wound) type and having a peripheral surface which coacts with the surface defining chamber 8 to prevent leakage therebetween. Seal 10 is so constructed that its inner diameter is smaller than the diameter of cable 9 when said seal 10 is not operatively associated with cable 9. Thus, when the seal is positioned on cable 9 a seal is formed therebetween while allowing substantially unrestricted movement of cable 9 through seal 10.

Body halves 3 and 4 are provided with a bore 11 which is smaller in diameter than cavity 5 but larger than the diameter of cable 9. The bore 11 and pivotal movement of ball 6 allows for misalignment of cable 9 without deformation of or damage to seal means 10. Body halves 3 and 4 are each provided with a plurality of integral fingers 12 by which the cable seal is mounted on bulkhead 2. Halves 3 and 4 of the body are clamped together by split ring means 13.

To operatively connect cable seal 1 to bulkhead 2, fingers 12 are compressed sufficiently to pass through a prepared hole in the bulkhead and then released to the position shown in FIG. 1. A split ring or washer 14 is positioned between collar means 15 of each body half and bulkhead 2 to securely maintain the cable seal positioned with respect to bulkhead 2.

The embodiment of cable seal 21 shown in FIGURES 2 through 5b is similar to the FIG. 1 device in that it includes identical body halves 23 and 24 formed to define a cavity 25 within which helically wound ball 26 is pivotally positioned, said ball 26 being made of one piece of materal and cut in a spiral pattern as shown at 27 in FIG. 4. Body halves 23 and 24 are each provided with integral tongue means 28 and groove means 29 for interlocking the body halves together. Ball 26 cooperates with the surface defining cavity 25 and with cable 30 in substantially the same manner as elements 6, 7, and 8 of the FIG. 1 device. Body halves 23 and 24 are provided with a radially extending flexible portion 31 shaped as a hollow truncated cone and integral latching or anchoring fingers 32 which function to operatively attach the cable seal to a bulkhead as described more fully hereinafter.

Cable seal 21 is positioned around cable 30 by winding the spiral cut ball 26 around cable 30 to function as a seal therewithin in the same manner as seal means 10 of FIG. 1 as described above. The cable with ball 26 wound therearound is placed in cavity 25 of body halves 23 and 24 which are interlocked by tongue and groove means 28 and 29. The peripheral surface of spiral cut ball coacts with the surface defining cavity 25 to prevent leakage therebetween. Cable seal 21 is then partially inserted into a prepared hole in bulkhead 22 thereby causing latching or anchoring fingers 32 to become partially straightened as shown in FIG. 5. Further insertion of cable seal 21 through bulkhead 22 causes distortion of flexible portion 31 of body halves 23 and 24 to allow entrapped latching fingers 32 to spring outwardly to their normal extended position as shown in FIG. 5a. When the inserting pressure is relaxed on cable seal 21, flexible portion 31 partially recovers its original shape and moves latching fingers 32 into firm contact with the reverse side of bulkhead 22 as shown in FIG. 5b. As in the FIG. 1 device, cable seal 21 is provided with an interior bore 33 to allow for cable misalignment.

Figure 8:
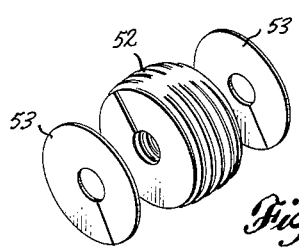
Figure 9:
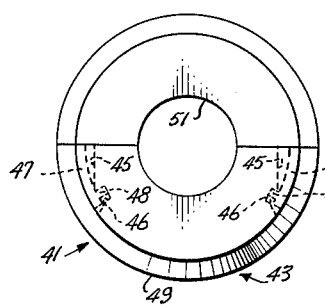
FIG. 9 is an end view of the FIG 6 cable seal showing the casing interlocked.
Figure 10:
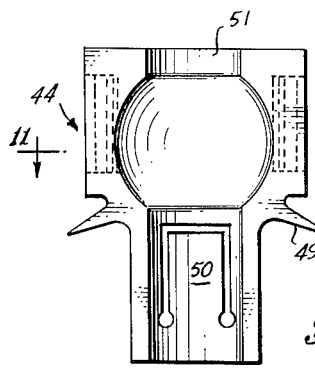
FIG. 10 is a view looking at the interior of the upper portion of the casing half of FIG. 6.
Figure 10A:
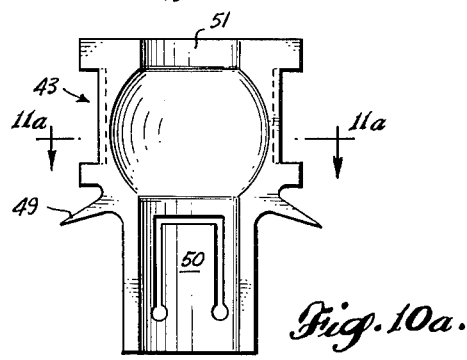
FIG. 10a is a view looking at the interior of the lower portion of the casing half of FIG. 6.

The preferred embodiment of the cable seal shown in FIGS. 6 and 9 to 11a is similar to the cable seal of FIGS. 2 to 5b, the only difference being in the means for interlocking the body halves. As shown in FIGS. 6 and 9, cable seal 41 comprises body halves 43 and 44 and a pivotable ball sealing means of the type shown in either FIG. 7 or 8, described hereinafter. Body half 43 has a portion of its exterior cut away to provide a flat surface on each side at 45 (see FIGS. 6, 9 and 11a). At the lower end of said flat surface 45, a groove 46 is cut in each side of body half 43, the grooves 46 being parallel to the longitudinal axis of body half 43.

Figure 11:
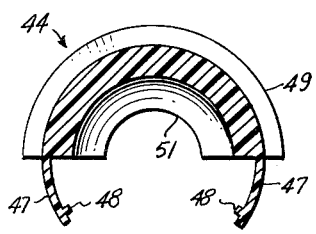
FIG. 11 is a cross-sectional view taken on line 11—11 of FIG. 10.
Figure 11A:
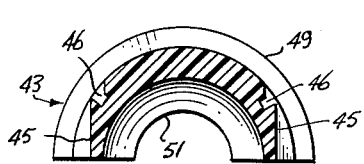

Body half 44 is provided on each side with protruding flexible lip means 47 having catch means 48 at the ends thereof (see FIGS. 6, 9 and 11). The lip means 47 and catch means 48 function similar to a pawl to engage grooves 46. When body halves 43 and 44 are to be interlocked the protruding lips 47 slide along flat surfaces 45 until ends 48 snap into grooves 46 thus providing a secure interlock between the body halves as shown in FIG. 9. As shown in FIG. 6, protruding lips 47 do not extend to the end of body half 44 and the flat surfaces 45 and grooves 46 of body half 43 define recesses therein whereby the portion of body half 43 which is not recessed prevents lip means 47 from moving axially in grooves 46.

To separate body halves 43 and 44, sufficient pressure must be exerted under ends 48 of lips 47 to raise them out of grooves 46, so it is thus seen that severe bending of the cable seal will not cause separation of the body halves and failure of the seal.

As shown in the FIGS. 2 to 5b embodiment, cable seal 41 is also provided with a flexible portion 49 and latching or anchoring fingers 50 which function to attach the cable seal to a bulkhead in the same manner described above with respect to FIGS. 5, 5a and 5b.

Cable seal 41 is provided with a bore 51 which, with the pivotal ball means, allows for cable misalignment.

The seal unit shown in FIG. 8 comprises a spiral cut ball 52 similar to element 26 of FIG. 4 and a split type washer 53 at each end of ball 52.

Figure 7:
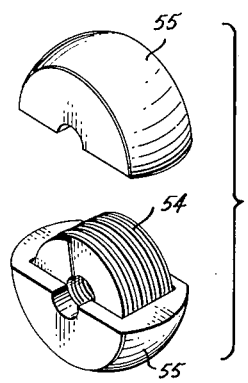
FIGS. 7 and 8 show embodiments of ball type sealing units of the FIG. 6 cable seal.

The seal unit shown in FIG. 7 differs from the FIG. 8 unit in that the helically wound ball portion 54 is of smaller outside diameter than ball 52 and is enclosed by cover halves 55. The seal unit of FIG. 7 is similar in design to elements 6, 7, and 8 of the FIG. 1 device.

While the seal units shown in FIGS. 7 and 8 are the preferred type for use in the FIGS. 6 and 9 to 11a cable seal, a seal unit of the type shown in FIGS. 1 and 4 could also be used, if desired.

As shown in FIGS. 6, 9 and 11, protruding lip means 47 are both positioned on body half 44. However, body halves 43 and 44 could be cast in the same die by providing each half with a protruding flexible lip 47 and a flat surface 45 and groove means 46, whereby the body halves would interlock in the same secure manner.

While the protruding flexible lips 47 have been shown integral with body half 44, these lips could be made separately and a groove cut into the exterior of body half 44 to accommodate the separate element, whereby it would function in the same manner as shown and described herein.

The parts of each of the cable seal embodiments described above can be made of materials such as metal, Teflon, nylon or other materials which have little or no reaction to ozone, lubricants, hydraulic fluids, moisture, high and low temperature, and abrasion.

While the helically wound sealing unit of the instant invention substantially eliminates leakage through the cable seal, it also functions to suppress the noise created by any leakage therethrough. Furthermore, the frequency range of this noise can be manipulated by changing the thickness of the helically wound unit.

It has thus been seen that the instant invention has provided an efficient and effective cable seal which overcomes each of the shortcomings of the cable seals currently in use and particularly eliminates possible jamming of control pulleys should the cable seal fail.

While particular embodiments of the invention have been illustrated and described, it will be obvious to those skilled in the art that various changes and modifications may be made without departing from the invention and it is intended to cover in the appended claim all such changes and modifications that come within the true spirit and scope of the invention.

What I claim is:

A cable seal adapted for use with a control cable which extends through a pressurized compartment bulkhead of an aircraft comprising: a body having a longitudinal bore extending therethrough, said bore being larger in diameter than the associated cable, a portion of said longitudinal bore being enlarged to define a chamber, pivotal means positioned in said chamber, said pivotal means functioning as a seal for the associated cable extending through said bore and said pivotal means, said pivotal means also functioning to prevent leakage through said chamber and said bore, said body comprising two portions, each said portions being provided with means for attachment to the other portion, said attachment means including flexible lip means and matching groove means, each said body portions having means including a flexible truncated cone portion and latching finger means for operatively positioning said body with respect to the associated bulkhead.

(References on following page)

References Cited by the Examiner

UNITED STATES PATENTS

| | | | |
|---|---|---|---|
| 833,961 | 10/1906 | Guss | 277—100 |
| 2,381,391 | 8/1945 | Brown | 308—72 |
| 2,459,721 | 1/1949 | Polorak | 154—33.1 |
| 2,895,769 | 7/1959 | Dwyer | 308—72 |
| 2,896,986 | 7/1959 | Sampo | 277—199 |
| 2,897,533 | 8/1959 | Bull et al. | 277—178 |
| 3,018,078 | 1/1962 | Holdren | 248—56 |
| 3,076,655 | 2/1963 | Washburn | 277—4 |

LAVERNE D. GEIGER, *Primary Examiner.*

SAMUEL ROTHBERG, *Examiner.*

E. DOWNS, *Assistant Examiner.*